United States Patent
Drews-Nicolai et al.

(10) Patent No.: US 7,166,157 B2
(45) Date of Patent: Jan. 23, 2007

(54) METHOD FOR THE SURFACE TREATMENT OF A TITANIUM DIOXIDE PIGMENT

(75) Inventors: Lydia Drews-Nicolai, Köln (DE);
Siegfried Bluemel, Ratigen (DE);
Lothar Elfenthal, Langenfeld (DE);
Volker Schmitt, Leichlingen (DE)

(73) Assignee: Kronos International Inc (DE)

( * ) Notice: Subject to any disclaimer, the term of this patent is extended or adjusted under 35 U.S.C. 154(b) by 148 days.

(21) Appl. No.: 10/638,154

(22) Filed: Aug. 8, 2003

(65) Prior Publication Data

US 2004/0025749 A1  Feb. 12, 2004

(30) Foreign Application Priority Data

Aug. 8, 2002 (DE) ............... 102 36 366

(51) Int. Cl.
*C09C 1/36* (2006.01)
*C01G 23/047* (2006.01)
*B32B 5/16* (2006.01)
*B32B 9/06* (2006.01)

(52) U.S. Cl. ............ 106/447; 106/436; 423/610; 428/402; 428/403; 428/499

(58) Field of Classification Search ........... 106/436, 106/443, 444, 447; 423/610; 428/402–403, 428/499
See application file for complete search history.

(56) References Cited

U.S. PATENT DOCUMENTS

| | | | | |
|---|---|---|---|---|
| 3,443,897 A | * | 5/1969 | Hoekje et al. | 423/337 |
| 3,468,689 A | * | 9/1969 | Darr et al. | 106/437 |
| 3,926,660 A | | 12/1975 | Holle et al. | |
| 5,114,486 A | | 5/1992 | Demosthenous et al. | |
| 5,165,995 A | * | 11/1992 | Losoi | 428/403 |
| 5,665,466 A | | 9/1997 | Guez et al. | |
| 5,922,120 A | * | 7/1999 | Subramanian et al. | 106/437 |
| 2005/0228112 A1 | * | 10/2005 | Takahashi et al. | 524/497 |

FOREIGN PATENT DOCUMENTS

| | | |
|---|---|---|
| GB | 724751 | 2/1955 |
| GB | 1073338 A | 6/1967 |
| GB | 1336292 A | 11/1973 |
| GB | 2042573 A | 11/1979 |

* cited by examiner

*Primary Examiner*—J. A. Lorengo
*Assistant Examiner*—Patricia L. Hailey
(74) *Attorney, Agent, or Firm*—Rodney T. Hodgson

(57) ABSTRACT

A method and material for improved $TiO_2$ pigment for paper and laminates is described. Phosphorous, titanium, and aluminum compounds are successively added to a $TiO_2$ pigment suspension. Resulting pigments show improved greying resistance and hiding power over prior art pigments, and show improved results as pigments in tests of paper and laminates.

50 Claims, No Drawings

METHOD FOR THE SURFACE TREATMENT OF A TITANIUM DIOXIDE PIGMENT

CROSS REFERENCE TO RELATED APPLICATIONS

This application claims priority pursuant to Title 35, United States Code, Section 119(a)–(d) or (f), or 365(b) to the German Patent Application Number DE 102 36 366 filed Aug. 8, 2002, where the above named application is hereby incorporated herein by reference in its entirety including incorporated material.

FIELD OF THE INVENTION

The field of the invention is the field of methods for the surface treatment of titanium dioxide pigments to produce a titanium dioxide pigment with high greying resistance and high hiding power, and its use in the production of decorative laminating paper.

BACKGROUND OF THE INVENTION

Decorative laminating paper is an element of a decorative thermoset surface, which is used with preference for finishing furniture surfaces and for laminate floorings. Laminate is the term used for materials in which wood and paper, for example, are pressed with resin. The use of special synthetic resins results in extraordinarily high resistance of the laminates to scratching, impact, chemicals and heat.

The use of special-purpose papers (decorative laminating papers) permits the production of decorative surfaces, where the decorative laminating paper serves not only as facing paper for unattractive wood material surfaces, but also as a carrier for the synthetic resin. The requirements imposed on decorative laminating paper include, for example, hiding power (opacity), light-fastness (greying resistance), colour-fastness, wet strength, impregnability and printability.

In principle, a pigment based on titanium dioxide is eminently suitable for achieving the necessary opacity of the decorative laminating paper. As a rule, a titanium dioxide pigment or a titanium dioxide pigment suspension is mixed with a fibre suspension during paper production. The interactions between the individual components (fibres, pigment, water) contribute to formation of the paper sheet and determine the retention of the pigment. The term retention refers to the retention of all inorganic substances in the paper during production. In addition to the pigment and fibres used as feedstock, auxiliaries and additives are generally also used. These may affect the mechanisms of interaction between the fibres, the pigment and the water.

A number of titanium dioxide pigments exists for applications in decorative laminating paper. Alongside the most important properties, such as retention and opacity (hiding power), the greying resistance also plays a decisive role.

It is generally known that titanium dioxide is photochemically active. When exposed to UV radiation in the presence of moisture, decorative laminating paper pigmented with titanium dioxide displays increasing greying. To avoid this problem, the surface of the pigments is treated with various substances, for instance with $Al_2O_3$ aquate and a colourless metal phosphate (U.S. Pat. No. 3,926,660), with zinc phosphate (U.S. Pat. No. 5,114,486), with cerium phosphate and aluminium phosphate (GB 2 042 573), or only with aluminium phosphate (EP 0 753 546 A2). DE 15 92 873 describes a method for improving the light-fastness of pigments, where calcination at 600° C. is performed following coating with magnesium silicate.

$TiO_2$ pigments with improved retention properties, having a cores coated with consecutive layers of aluminium oxide phosphate, aluminium oxide and magnesium oxide, are presented in EP 0 713 904 B1, U.S. Pat. No. 5,665,466 and U.S. Pat. No. 5,942,281.

A $TiO_2$ pigment, having a core coated with consecutive layers of zirconium hydroxide or oxyhydroxide, titanium hydroxide or oxyhydroxide, and co-precipitated phosphate and silica, and finally a layer of aluminum oxyhydroxide and magnesium oxide, is shown to protect the organic pigment binder from light and to decrease the loss of gloss in paint in U.S. Pat. No. 6,200,375.

All of the preceding publications, patents, and patent applications are hereby included in their entirety in this application.

OBJECTS OF THE INVENTION

It is an object of the invention to produce a method capable of producing pigments with high hiding power and simultaneously high greying resistance.

It is an object of the invention to produce a method capable of producing pigments with high hiding power and simultaneously high greying resistance for use in decorative laminating papers.

SUMMARY OF THE INVENTION

The steps of the most preferred method of the invention are:
a) Addition of a phosphorus compound to an aqueous suspension of titanium dioxide base material;
b) Addition of a titanium compound;
c) Addition of an aluminium compound;
d) Adjustment of the pH value of the suspension to a pH value of 8 to 10, preferably 8.5 to 9.5;
e) Addition of a magnesium compound;
f) Stabilisation of the pH value of the suspension in the range from 8 to 10, preferably 8.5 to 9.5; and
g) Separation of the $TiO_2$ pigment by filtration, followed by washing, drying and milling of the pigment.

DETAILED DESCRIPTION OF THE INVENTION

Using pigments with improved greying resistance produced by prior art methods generally reduces retention and/or opacity in laminates. Prior art improvements in opacity are accompanied by a deterioration in greying resistance.

Therefore, the object of the present invention is to offer a method capable of producing pigments with high hiding power and simultaneously high greying resistance for use in decorative laminating papers.

The object is solved by subjecting a titanium dioxide pigment to a surface treatment process characterised by the following steps:
a) Preparation of an aqueous suspension of titanium dioxide base material,
b) Addition of a phosphorus compound,
c) Addition of a titanium compound,
d) Addition of an aluminium compound,
e) Adjustment of the pH value of the suspension to a pH value of 8 to 10, preferably 8.5 to 9.5,
f) Addition of a magnesium compound, g) Stabilisation of the pH value of the suspension in the range from 8 to 10, preferably 8.5 to 9.5, h) Separation of the $TiO_2$ pigment by filtration, followed by washing, drying and milling of the pigment.

No significant amount of zirconium compound is or bins been added to the aqueous suspension of titanium dioxide base material.

Other advantageous versions of the method are described in the dependent claims of the invention.

The object of the invention is, therefore, a method for the surface treatment of titanium dioxide pigments that results in pigments with high hiding power and high retention with simultaneously high greying resistance, as well as a pigment with these properties and the use of this pigment in the production of decorative laminating paper.

Surprisingly, it was found that the addition of a titanium compound during the inorganic surface treatment of the pigment with phosphorus and aluminium compounds is capable of achieving both high opacity and very good greying resistance. No zirconium compounds were added to the suspension to achieve this result.

The surface treatment process is based on $TiO_2$ base material, preferably produced by the chloride process. The term $TiO_2$ base material refers to the raw $TiO_2$ pigment prior to post-treatment. The base material can first be milled, for example in a wet-milling process. A dispersant is preferably added during wet-milling. The milled base material is used to prepare an aqueous suspension. This suspension can be basic or acidic and is preferably basic with a pH value of 9 to 11. The method is performed at a temperature of less than 70° C., preferably at 55 to 65° C.

First, a phosphorus compound is added to the suspension in a quantity of 0.4 to 6.0% by weight, preferably 1.0 to 4.0% by weight, calculated as $P_2O_5$, referred to $TiO_2$ base material. Particularly good results are obtained with $P_2O_5$ contents of 1.6 to 2.8% by weight, referred to the base material. Other suitable phosphorus compounds are preferably inorganic phosphorus compounds, such as alkali phosphates, ammonium phosphate, polyphosphates, phosphoric acid or, where appropriate, mixtures of these compounds. Other phosphorus compounds can, however, also be used.

Second, a titanium compound is added, e.g. titanyl sulphate, titanyl chloride or another hydrolysable titanium compound, or mixtures of these compounds. The quantity of titanium compound added is 0.1 to 3.0% by weight, preferably 0.1 to 1.5% by weight, and particularly 0.1 to 1.0% by weight, calculated as $TiO_2$ referred to $TiO_2$ base material in the suspension.

Third, an aluminium compound of acidic or basic character is preferably subsequently added to the suspension. Particularly suitable as an acidic aluminium compound is aluminium sulphate, although this is not to be taken as a restriction. Suitable alkaline aluminium compounds include sodium aluminate, alkaline aluminium chloride, alkaline aluminium nitrate or other alkaline aluminium salts, or mixtures of these compounds.

The suspension will customarily be stirred for about 30 minutes following each addition, in order to achieve homogenisation. It is, however, also possible to add the titanium compound and the aluminium compound simultaneously.

In a preferred embodiment of the method, an acid or a base, or a second aluminium compound, is added in parallel with the aluminium compound, in order to maintain a constant pH value in the range from 2 to 10, preferably in the range from 4 to 9 and particularly in the range from 6 to 8. In a particularly advantageous version of the method, the pH value is controlled by the balanced, parallel addition of sodium aluminate and HCl. A further procedure consists in keeping the pH value constant by means of the controlled addition of aluminium sulphate and sodium aluminate.

The suspension is subsequently adjusted to a pH value of 8 to 10, preferably 8.5 to 9.5. A person skilled in the art adjusts the pH value in the customary manner with the help of appropriate acidic or alkaline compounds. The alkalis used for this purpose include, for example, alkaline aluminium salts, such as sodium aluminate, alkaline aluminium chloride or alkaline aluminium nitrate, or bases, such as sodium hydroxide solution or ammonia, or a combination of these alkalis.

The total quantity of aluminium added to the suspension by way of the various aluminium compounds is 2.0 to 7.5% by weight, preferably 3.5 to 7.5% by weight, calculated as $A_2O_3$, referred to $TiO_2$ base material.

0.1 to 1% by weight, preferably 0.2 to 0.5% by weight, of a magnesium compound is then added, calculated as MgO and referred to $TiO_2$ base material. Suitable for use as the magnesium compound are water-soluble magnesium salts, such as magnesium sulphate, magnesium chloride and other magnesium salts, as well as mixtures of these compounds. The pH value should be maintained at 8 to 10, preferably at 8.5 to 9.5, and most preferably approximately 8 with the help of appropriate alkaline media, if necessary.

The post-treated $TiO_2$ pigment is subsequently separated from the suspension by filtration, and the resultant filter cake is washed.

To further improve the greying resistance, the pigment can additionally be treated with nitrate at a concentration of up to 1.0% by weight in the finished pigment.

Moreover, the final pH value of the pigment may be set by adding a suitable pH modifying substance such as an acid, a base, an acid salt, or a basic salt, or a combination of suitable substances. The pH value is controlled by means of the degree of acidity and the added quantity of the substance. In principle, all compounds may be used which do not impair the optical pigment properties, which are temperature resistant during the final pigment drying or pigment milling and which can be added to the filter paste, into the dryer or during steam jet milling. For instance, acids like sulphuric acid, nitric acid, hydrochloric acid or citric acid or acidic salts like chlorides, sulfates or the like are suitable if they comply to the conditions specified.

Nitrate compounds are particularly suitable. By utilizing sodium nitrate the final pH value comes to more than 9. Yet, the decrease of the pH value can be achieved by the use of acidic nitrate compounds or a combination of acidic and non-acidic nitrate compounds as for instance aluminium nitrate, a combination of aluminium nitrate and sodium nitrate, a combination of aluminium nitrate and nitric acid and so forth. For example, the addition of aluminium nitrate in a quantity of 0.4% by weight calculated as NO3 in the filter paste results in a lowered final pH value of from 7.5 to 8.5, preferably approximately 8.

Finally, the pigment is dried and milled.

In comparison with the reference pigments, the pigment produced according to this method displays improved hiding power and improved greying resistance in the laminate, as well as good retention, and is outstandingly suitable for use in decorative laminating paper.

EXAMPLES

An example of the invention is described below. Unless otherwise stated, the quantity data refer to $TiO_2$ base material in the suspension.

Example 1

After sand-milling, a suspension of titanium dioxide from the chloride process with a $TiO_2$ concentration of 400 g/l is adjusted to a pH value of 10 with NaOH at 60° C. 2.4% by weight $P_2O_5$ in the form of disodium hydrogenphosphate solution is added to the suspension while stirring. The solution is added over a period of 60 minutes. After further stirring for 30 minutes, 0.2% by weight $TiO_2$ in the form of titanyl sulphate solution is then added. This is followed by further stirring for 30 minutes. In the next step, 2.7% by weight $Al_2O_3$ in the form of acidic aluminium sulphate solution is mixed into the suspension within 30 minutes. After stirring for 30 minutes, the acidic suspension is set to a pH value of 9.0 with the help of an alkaline sodium aluminate solution in a quantity of 3.7% by weight, calculated as $Al_2O_3$. The solution is added over a period of 40 minutes. After stirring for 30 minutes, 0.5% by weight MgO in the form of a magnesium sulphate solution is added. After further stirring for 30 minutes the suspension is set to a pH value of 9 with NaOH.

After being stirred for a further 2 hours, the post-treated $TiO_2$ suspension is filtered and washed. Following the addition of 0.25% by weight $NO_3$ in the form of $NaNO_3$, referred to $TiO_2$ pigment, the washed filter paste is dried in a spray drier and subsequently steammilled.

Comparative Example 1

The pigment is produced in a manner comparable to that described in Example 1, except that titanyl sulphate and magnesium sulphate are not components of the post-treatment. While stirring, 2.4% by weight $P_2O_5$ in the form of disodium hydrogenphosphate solution is added to the sand-milled $TiO_2$ suspension (400 g/l $TiO_2$), which has a temperature of 60° C. and a pH value of 10. In the next step, 3.0% by weight $Al_2O_3$ is mixed into the suspension in the form of acidic aluminium sulphate solution. The acidic suspension is set to a pH value of 7.2 with the help of an alkaline sodium aluminate solution in a quantity of 3.4% by weight, calculated as $Al_2O_3$. The further processing steps (filtration, washing, nitrate treatment, drying, milling) are the same as in Example 1.

Comparative Example 2

The pigment is produced in a manner comparable to that described in Example 1, except that titanyl sulphate is not a component of the post-treatment.

While stirring, 2.4% by weight $P_2O_5$ in the form of disodium hydrogenphosphate solution is added to the sand-milled $TiO_2$ suspension (400 g/l $TiO_2$), which has a temperature of 60° C. and a pH value of 10. In the next step, 2.6% by weight $Al_2O_3$ is mixed into the suspension in the form of acidic aluminium sulphate solution. The acidic suspension is set to a pH value of 9.2 with the help of an alkaline sodium aluminate solution in a quantity of 3.0% by weight, calculated as $Al_2O_3$. This is followed by the addition of 0.5% by weight MgO in the form of magnesium sulphate solution. NaOH is used to set a pH value of 9. The further processing steps are the same as in Example 1 and Comparative example 1.

Test Methods

The titanium dioxide pigments produced as described above were incorporated into decorative laminating paper based on melamine resin and subsequently tested with regard to their optical properties and greying resistance in pressed laminates. To this end, the titanium dioxide pigment to be tested was incorporated into cellulose, and sheets with a sheet weight of roughly 100 g/m² and a $TiO_2$ content of about 40% by mass were produced.

a) Laminate Production (Laboratory Scale)

A 36.5% aqueous pigment suspension made of 146 g titanium dioxide pigment and 254 g tap water is prepared. Testing is based on 30 g pulp (oven-dry). The corresponding quantity of pigment suspension is adapted to the retention and the required ash content, 40±1% in this case, and the grammage, 100±1 g/m² in this case. A person skilled in the art is familiar with the procedure and the auxiliaries used.

The ash content (titanium dioxide content) of a sheet and the retention of the pigment are subsequently determined. The ash content is determined by incinerating a defined weight of the produced paper in a rapid incinerator at 900° C. The $TiO_2$ content by mass (equivalent to the ash content) can be calculated by weighing the residue.

The retention is defined as the capacity to retain all inorganic substances in the sheet of paper on the wire screen of the paper-making machine. The "one-pass retention" indicates the percentage retained during a single feeding step to the paper-making machine. The ash content in percent referred to the percentage by mass of the pigment used relative to the total solids in the suspension yields the retention.

The further processing of the paper encompasses its impregnation and pressing into laminates. The sheet to be impregnated with resin is immersed in a resin solution and pre-condensed for 25 seconds at 130° C. in a recirculating-air drying oven. Impregnation is performed a second time in similar manner, where the dwell time in the drying oven is 110 seconds. The sheet has a residual moisture content of 4 to 6% by weight. The condensed sheets are combined into stacks with phenolic resin-impregnated core papers, and white and black underlay paper.

The laminate structure used for the test comprised 9 layers: decor sheet, decor sheet, core paper, core paper, black underlay, core paper, core paper, black/white underlay, decor sheet.

The stacks are pressed for 300 seconds with the help of a Wickert Type 2742 laminating press at a temperature of 140° C. and a pressure of 90 bar.

b) Testing

The optical properties and the greying resistance of the laminates were measured using commercially available equipment (spectrophotometer, Xenotest weathering machine).

In order to assess the optical properties of laminates, the optical values (CIELAB L*, a*, b*) to DIN 6174 are measured with the help of the ELREPHO® 3000 calorimeter over white and black underlay. The opacity is a measure of the light transmission of the paper. The following parameters were selected as a measure of the opacity of the laminates: CIELAB $L^*_{black}$, the brightness of the laminates measured over black underlay paper, and the opacity value $L[\%] = Y_{black}/Y_{white} \times 100$, determined from the Y-value measured over black underlay paper ($Y_{black}$) and the Y-value measured over white underlay paper ($Y_{white}$). The values are measured using a spectrophotometer (ELREPHO® 3000).

To assess the greying resistance (light-fastness) of the titanium dioxide pigments or titanium dioxide pigment blends, the corresponding laminate samples are exposed in a XENOTEST® 150S. The side of the laminate on which two papers are laminated together is measured for the assessment. The CIELAB $L^*$, $a^*$ and $b^*$ optical values to DIN 6174 are measured before and after 96 hours of exposure in the XENOTEST® 150S. The light source is a xenon-arc lamp. The temperature inside the device is 23±3° C., the relative humidity being 65±5%. The samples are rotated during the exposure cycle. Both $\Delta L^* = L^*_{before} - L^*_{after}$ and $\Delta E^* = ((\Delta L^*)^2 + (\Delta a^*)^2 + (\Delta b^*)^2)^{1/2}$ are stated as a measure of the greying resistance.

Test Results:

The test results for the laminates produced using the pigment according to the invention from the Example 1 and the pigments from Comparative examples 1 and 2 are summarised in Table I. All three examples and comparative examples are set to the same ash content.

It can be seen that the laminate produced using the pigment according to the invention (Example 1) is characterised by both high opacity ($L^*_{black}$ and L) and high greying resistance ($\Delta L^*$ and $\Delta E^*$). In contrast, the laminates produced using the two reference pigments 1 and 2 display significantly lower values for either opacity (Comparative example 1) or greying resistance (Comparative example 2). In addition, the retention of the paper produced using the pigment according to the invention was improved relative to Comparative example 2.

Obviously, many modifications and variations of the present invention are possible in light of the above teachings. It is therefore to be understood that, within the scope of the appended claims, the invention may be practiced otherwise than as specifically described.

TABLE I

| | CIELAB optical values | | | | | | Opacity | Ash content | Retention (one-pass) | Greying resistance | |
|---|---|---|---|---|---|---|---|---|---|---|---|
| | over white | | | over black | | | | | | | |
| | L* | a* | b* | L* | a* | b* | L [%] | [% by wt.] | [% by wt.] | ΔL* | ΔE* |
| Example 1 | 93.1 | −1.2 | 2.6 | 90.9 | −1.3 | 0.5 | 94.1 | 40.4 | 74 | 1.0 | 1.5 |
| Comparative example 1 | 92.9 | −1.2 | 2.8 | 90.2 | −1.3 | 0.5 | 92.8 | 40.6 | 75 | 1.1 | 1.6 |
| Comparative example 2 | 93.2 | −1.2 | 2.5 | 90.9 | −1.2 | 0.4 | 93.7 | 40.5 | 72 | 1.3 | 1.8 |

Coverage 100 grams/m² in all tests

We claim:

1. A method for producing a pigment, comprising:
   a) adding a phosphorus compound to an aqueous suspension of titanium dioxide base material, then
   b) adding a titanium compound; and
   c) adding an aluminum compound,
   wherein no significant amount of zirconium compound is or has been added to the aqueous suspension of titanium dioxide base material; and then
   d) adjusting the pH value of said suspension to a value of from 8 to 10; and then
   e) adding a magnesium compound.

2. The method of claim 1, wherein the added phosphorus compound is an inorganic phosphorus compound.

3. The method of claim 2, wherein the inorganic phosphorus compound is selected from the group consisting of alkali phosphates, ammonium phosphates, polyphosphates, and phosphoric acid.

4. The method of claim 1, wherein the added phosphorus compound is 0.4 to 6.0% by weight calculated as $P_2O_5$, referred to $TiO_2$ base material in the suspension.

5. The method of claim 4, wherein the added phosphorus compound is 1.0 to 4.0% by weight, calculated as $P_2O_5$, referred to $TiO_2$ base material in the suspension.

6. The method of claim 5, wherein the added phosphorus compound is 1.6 to 2.8% by weight, calculated as $P_2O_5$, referred to $TiO_2$ base material in the suspension.

7. The method of claim 1, wherein the titanium compound added is a hydrolyzable titanium compound.

8. The method of claim 7, wherein the titanium compound added is selected from the group consisting of titanyl sulphate and titanyl chloride.

9. The method of claim 7, wherein the quantity of titanium compound added is 0.1 to 3.0 by weight, calculated as $TiO_2$, referred to $TiO_2$ base material in the suspension.

10. The method of claim 9, wherein the quantity of titanium compound added is 0.1 to 1.5% by weight, referred to $TiO_2$ base material in the suspension.

11. The method of claim 10, wherein the quantity of titanium compound added is 0.1 to 1.0% by weight, calculated as $TiO_2$, referred to $TiO_2$ base materia in the suspension.

12. The method of claim 1, wherein the quantity of titanium compound added is 0.1 to 1.0% by weight, calculated as $TiO_2$, referred to $TiO_2$ base material in the suspension.

13. The method of claim 1, wherein the aluminum compound added is alkaline.

14. The method of claim 13, wherein the alkaline aluminum compound is selected from the group Consisting of sodium aluminate, alkaline aluminum chloride, and alkaline aluminum nitrate.

15. The method of claim 13, further comprising
   d) adjusting the pH value of the suspension to a value of from 8 to 10 after step c).

16. The method of claim 1, wherein the aluminum compound added is acidic.

17. The method of claim 16, further comprising:
   d) adjusting the pH value to a value between 8 and 10 by adding an alkaline aluminum compound.

18. The method of claim 16, further comprising:
   d) adjusting the pH value to a value between 8 and 10 by adding an alkaline aluminum compound in combination with a base.

19. The method of claim 1, wherein during the addition of the aluminum compound, the pH value of the suspension is maintained constant in the range from 2 to 10 by the simultaneous addition of a pH modifying compound.

20. The method of claim 19, wherein during the addition of the aluminum compound, the pH value of the suspension is maintained constant in the range from 4 to 9 by the simultaneous addition of a pH modifying compound.

21. The method of claim 20, wherein during the addition of the aluminum compound, the pH value of the suspension is maintained constant in the range from 6 to 8 by the simultaneous addition of a pH modifying compound.

22. The method of claim 1, wherein the total quantity of the aluminum compounds added is 2.0 to 7.5% by weight, calculated as $Al_2O_3$, referred to $TiO_2$ base material.

23. The method of claim 22, wherein the total quantity of the aluminum compounds added is 3.5 to 7.5% by weight, calculated as $Al_2O_3$, referred to $TiO_2$ base material.

24. The method of claim 1, wherein the magnesium compound added is selected from the group consisting of magnesium sulphate and magnesium chloride.

25. The method of claim 1, wherein the quantity of magnesium compound added is 0.1 to 1.0% by weight, calculated as MgO, referred to $TiO_2$ base material in the suspension.

26. The method of claim 25, wherein the quantity of magnesium compound added is 0.2 to 0.5% by weight, calculated as MgO, referred to $TiO_2$ base material in the suspension.

27. The method of claim 1, further comprising
f) treating the pigment with an added material in order to influence the final pH value of the suspension wherein the final pH value of the pigment is controlled by the pH and the quantity of the added material.

28. The method of claim 27, where the added material is a nitrate compound.

29. The method of claim 28, where the finished pigment contains up to 1.0% by weight $NO_3$.

30. The method of claim 1, where the titanium dioxide base material is milled before step a).

31. The method of claim 30, where the titanium dioxide base material is wet-milled and where a dispersant is added during milling.

32. A material, comprising;
a titanium dioxide pigment material; the titanium dioxide comprising $TiO_2$ particles, each particle having a surface;
phosphorus containing material attached to the surface of each particle;
titanium containing material additional to the titanium dioxide material of the surface attached to the phosphorus containing material;
aluminum containing material attached to the titanium containing material additional to the titanium dioxide material of the surface, and;
magnesium containing material attached to the aluminum containing material.

33. The material of claim 32, further comprising;
nitrate containing material attached to the aluminum containing material.

34. The material of claim 32, further comprising;
nitrate and magnesium containing material attached to the aluminum containing material.

35. The material of claim 32, wherein the resultant particles contain an insignificant amount of zirconium.

36. The material of claim 32, wherein the titanium dioxide pigment material is incorporated into a decorative laminated paper.

37. The material of claim 32, wherein the titanium dioxide pigment material is incorporated into a decorative laminated paper.

38. The material of claim 33, wherein the titanium dioxide pigment material is incorporated into a decorative laminated paper.

39. The material of claim 34, wherein the titanium dioxide pigment material is incorporated into a decorative laminated paper.

40. The material of claim 35, wherein the titanium dioxide pigment material is incorporated into a decorative laminated paper.

41. A method for producing a pigment, comprising:
a) adding a phosphorus compound to an aqueous suspension of titanium dioxide base material, then
b) adding a titanium compound; and
c) adding an acidic aluminum compound wherein no significant amount of zirconium compound is or has been added to the aqueous suspension of titanium dioxide base material; and then
d) adjusting the pH value of said suspension to a value of from 8 to 10; and then
e) adding a magnesium compound.

42. The method of claim 41, further comprising:
f) adjusting the pH value to a value between 8 and 10 by adding an alkaline aluminum compound.

43. The method of claim 41, further comprising:
f) adjusting the pH value to a value between 8 and 10 by adding an alkaline aluminum compound in combination with a base.

44. A method for producing a pigment, comprising:
a) adding a phosphorus compound to an aqueous suspension of titanium dioxide base material, then
b) adding a titanium compound; and
c) adding an aluminum compound, and then
d) adding a magnesium compound.

45. The method of claim 44, wherein the magnesium compound added is selected from the group consisting of magnesium sulphate and magnesium chloride.

46. The method of claim 44, wherein the quantity of magnesium compound added is 0.1 to 1.0% by weight, calculated as MgO, referred to $TiO_2$, base material in the suspension.

47. The method of claim 46, wherein the quantity of magnesium compound added is 0.2 to 0.5% by weight, calculated as MgO, referred to $TiO_2$ base material in the suspension.

48. The method of claim 44, further comprising
e) treating the pigment with an added material in order to influence the final pH value of the suspension wherein the final pH value of the pigment is controlled by the pH and the quantity of the added material.

49. The method of claim 48, where the added material is a nitrate compound.

50. The method of claim 49, where the finished pigment contains up to 1.0% by weight $NO_3$.

* * * * *